United States Patent
McNeeney et al.

(10) Patent No.: US 10,853,071 B2
(45) Date of Patent: Dec. 1, 2020

(54) SIMULATION OF EXCLUSIVE INSTRUCTIONS

(71) Applicant: Arm Limited, Cambridge (GB)

(72) Inventors: Adam James McNeeney, Histon (GB); Gareth James Evans, Sandhurst (GB)

(73) Assignee: Arm Limited, Cambridge (GB)

( * ) Notice: Subject to any disclaimer, the term of this patent is extended or adjusted under 35 U.S.C. 154(b) by 77 days.

(21) Appl. No.: 16/203,886

(22) Filed: Nov. 29, 2018

(65) Prior Publication Data

US 2019/0220279 A1 Jul. 18, 2019

(30) Foreign Application Priority Data

Jan. 16, 2018 (GB) .................................. 1800663.5

(51) Int. Cl.
*G06F 9/30* (2018.01)
*G06F 9/455* (2018.01)

(52) U.S. Cl.
CPC ...... *G06F 9/30043* (2013.01); *G06F 9/30021* (2013.01); *G06F 9/4552* (2013.01); *G06F 9/45504* (2013.01)

(58) Field of Classification Search
None
See application file for complete search history.

(56) References Cited

U.S. PATENT DOCUMENTS

| | | | | |
|---|---|---|---|---|
| 8,688,432 B2 * | 4/2014 | Gheith | ................ | G06F 9/45537 703/23 |
| 8,793,471 B2 * | 7/2014 | Serebrin | ................ | G06F 9/467 710/200 |
| 10,204,195 B2 * | 2/2019 | Bashore | .............. | G06F 11/3632 |
| 2007/0143551 A1* | 6/2007 | Marr | .................. | G06F 9/30021 711/154 |
| 2013/0332660 A1* | 12/2013 | Talagala | .............. | G06F 12/0246 711/103 |
| 2015/0212934 A1* | 7/2015 | Shanmugam | ........... | G06F 13/24 711/154 |
| 2015/0248367 A1* | 9/2015 | Tucek | ................... | G06F 16/172 710/308 |
| 2015/0263992 A1* | 9/2015 | Kuch | ................... | H04L 49/354 709/225 |
| 2017/0235557 A1* | 8/2017 | Dang | ................... | G06F 9/4552 717/153 |

OTHER PUBLICATIONS

Emilio G. Cota, et al., "Cross-ISA Machine Emulation for Multicores", 2017 IEEE/ACM International Symposium on Code Generation and Optimization, Feb. 2017, 11 pages.
Combined Search and Examination Report for GB Patent Application No. 1800663.5, dated Jul. 4, 2018, 6 pages.

(Continued)

*Primary Examiner* — Eric Coleman
(74) *Attorney, Agent, or Firm* — Nixon & Vanderhye P.C.

(57) ABSTRACT

A method and apparatus for simulating target program code on a host data processing apparatus, the simulation mapping load-exclusive instructions in the target program code to load instructions, and mapping store-exclusive instructions in the target program code to compare-and-swap instructions.

14 Claims, 8 Drawing Sheets

(56) References Cited

OTHER PUBLICATIONS

M.M. Michael, "ABA Prevention Using Single-Word Instructions" IBM Research Report RC23089 (W0401-136) Jan. 29, 2004, Computer Science, 6 pages.

M. Moir, "Practical Implementations of Non-Blocking Synchronization Primitives" Proceedings of the $16^{th}$ Annual ACM Symposium on Principles of Distributed Computing, Aug. 1997, 10 pages.

S. Doherty et al, "Bringing Practical Lock-Free Synchronization to 64-Bit Applications" PODC'04: Proceedings of the $23^{rd}$ Annual ACM Symposium on Principles of Distributed Computing, Jul. 25-28, 2004, pp. 31-39.

P. Jayanti et al, "Efficient and Practical Constructions of LL/SC Variables" PODC'03: Proceedings of the $22^{nd}$ Annual ACM Symposium on Principles of Distributed Computing, Jul. 13-16, 2003, pp. 285-294.

\* cited by examiner

SIMULATION OF EXCLUSIVE INSTRUCTIONS

This application claims priority to GB 1800663.5 filed Jan. 16, 2018, the entire contents of which is hereby incorporated by reference.

The present technique relates to the field of simulation, and in particular to the simulation of exclusive instructions.

Some data processing apparatuses use exclusive instructions to achieve atomic updates of values in memory. An atomic update to a memory location is an update that appears to the rest of the system to have taken place instantaneously and without interruption, ensuring that no other process can interfere with the updating of that memory location. Exclusive instructions typically load-exclusive instructions paired with store-exclusive instructions—are one method of achieving atomic updates.

In at least some examples, the present technique provides a method for controlling execution of target program code on a host data processing apparatus to simulate execution of the target program code on a target processing apparatus, the method comprising:

in response to a load-exclusive instruction of the target program code, mapping the load-exclusive instruction to a load instruction to be executed by the host data processing apparatus to load a value from a memory location, and storing metadata related to the load-exclusive instruction, wherein the metadata comprises at least the value loaded from the memory location; and in response to a store-exclusive instruction of the target program code, emulating the store-exclusive instruction using an atomic compare-and-swap instruction to be executed by the host data processing apparatus;

the atomic compare-and-swap instruction specifying, as a compare value to be compared against the value stored at the memory location when the atomic compare-and-swap instruction is executed, the value loaded from the memory location as specified by the metadata.

In another example, the present technique provides a computer program for controlling a host data processing apparatus to perform the method described above.

In another example, the present technique provides a storage medium storing the computer program described above.

In another example, the present technique proves an apparatus comprising:

host processing circuitry; and control circuitry configured to control the host processing circuitry to carry out the method described above.

In another example, the present technique provides a computer program for controlling execution of target program code on a host data processing apparatus to simulate execution of the target program code on a target processing apparatus, wherein the computer program comprises:

load-exclusive program logic to map, in response to a load-exclusive instruction of the target program code, the load-exclusive instruction to a load instruction to be executed by the host data processing apparatus to load a value from a memory location, and to store metadata related to the load-exclusive instruction, wherein the metadata comprises at least the value loaded from the memory location; and store-exclusive program logic responsive to a store-exclusive instruction of the target program code to emulate the store-exclusive instruction using an atomic compare-and-swap instruction to be executed by the host data processing apparatus;

the atomic compare-and-swap instruction specifying, as a compare value to be compared against the value stored at the memory location when the atomic compare-and-swap instruction is executed, the value loaded from the memory location as specified by the metadata.

Further features and advantages of the present technique will be apparent from the following description of examples, which is to be read in conjunction with the accompanying drawings, in which.

Figure 2:
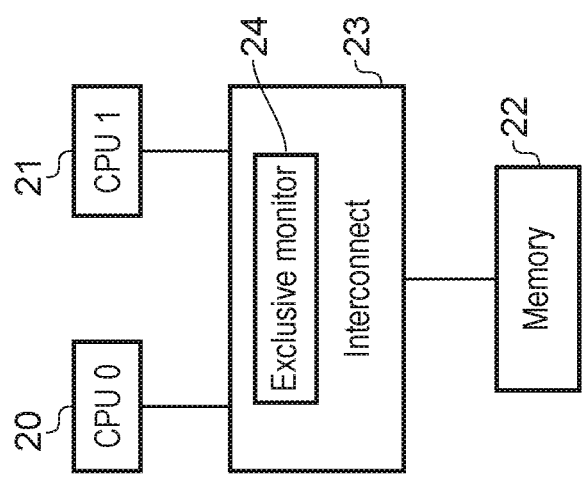

FIG. 2 schematically shows an example of an apparatus for performing atomic updates of a memory location using exclusive instructions.

Figure 3:
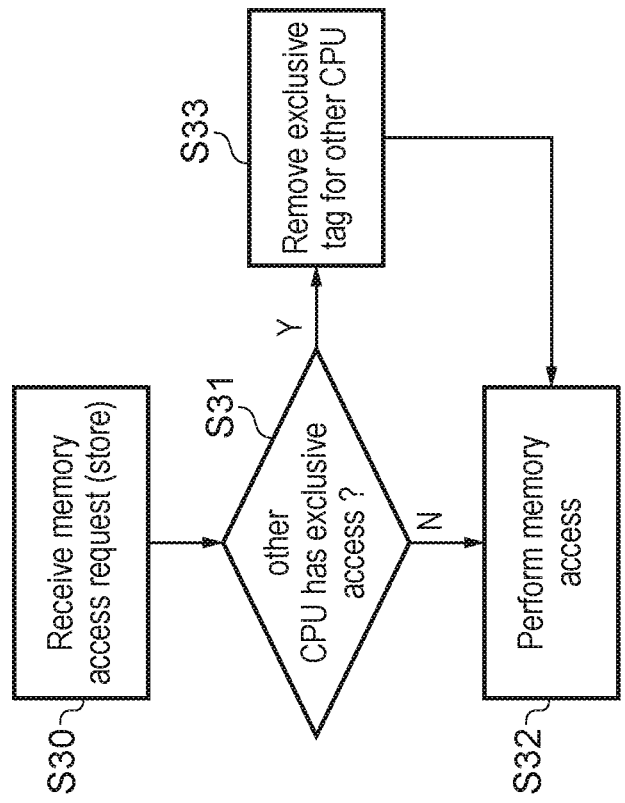

FIG. 3 is a flow diagram showing an example of a response of an apparatus as in FIG. 2 to a memory access request.

Figure 4:
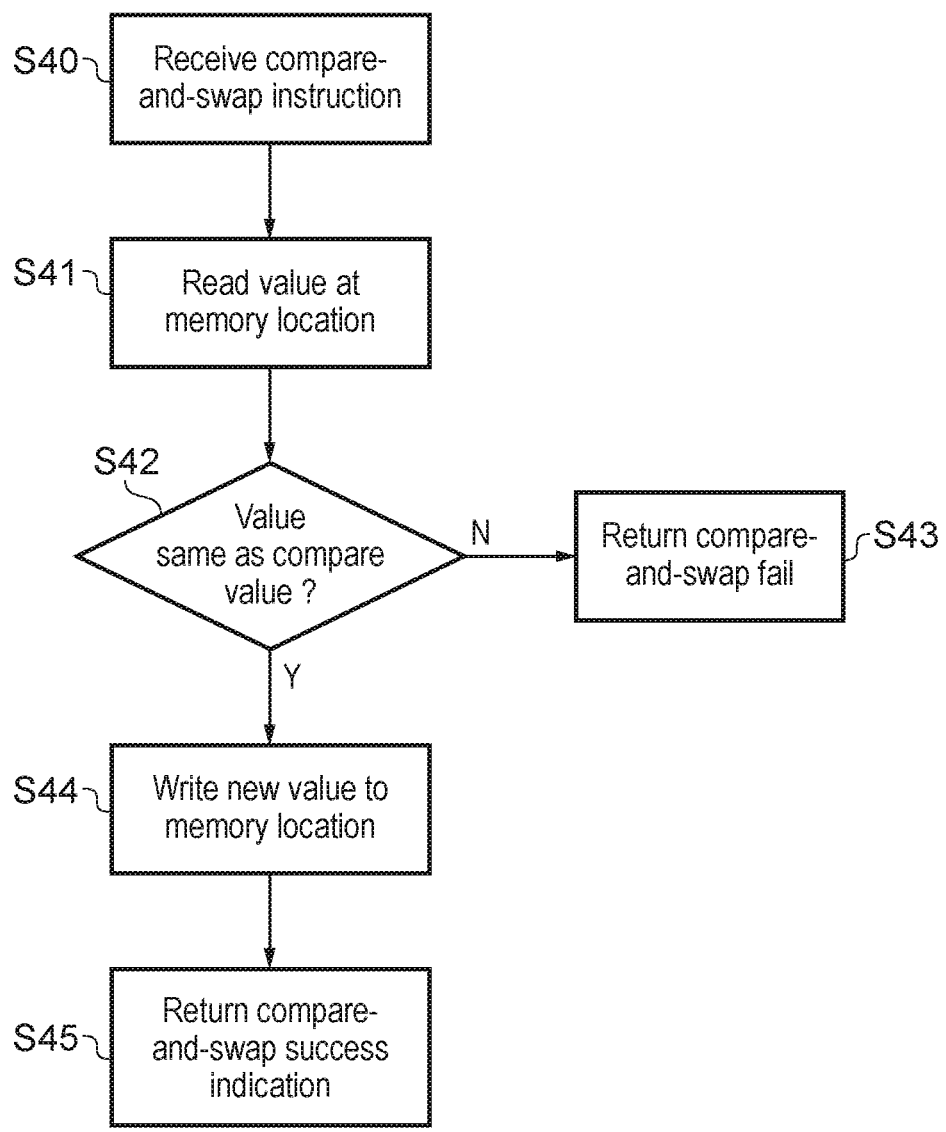

FIG. 4 is a flow diagram showing an example of an atomic compare-and-swap instruction.

Figure 5:
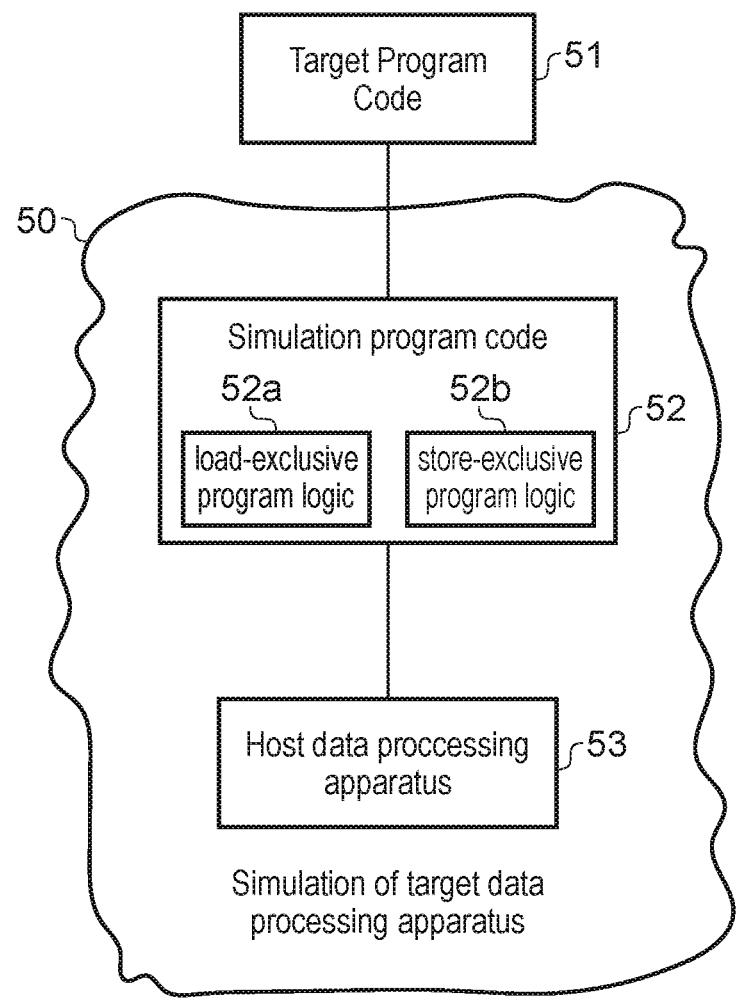

FIG. 5 schematically shows an example of simulating target program code on a host data processing apparatus.

Figure 6B:
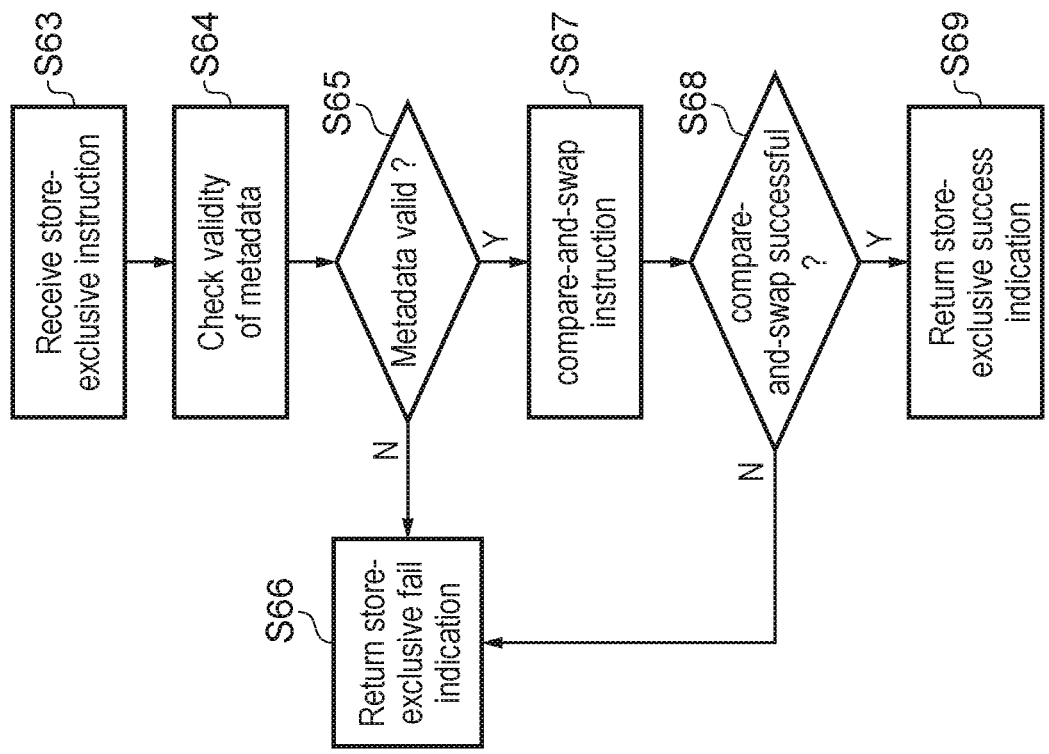
Figure 6A:
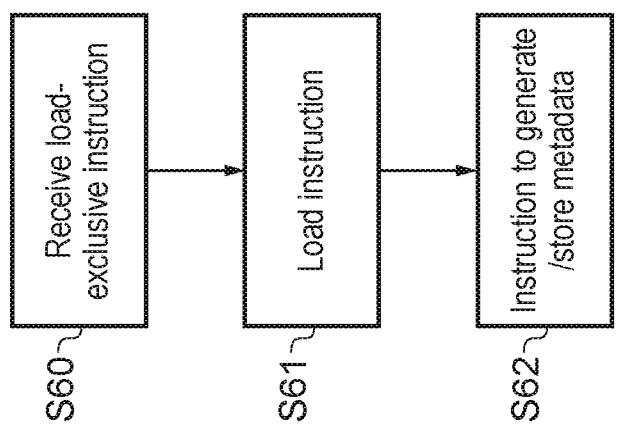

FIG. 6A is a flow diagram showing the response of a simulation to a load-exclusive instruction.

FIG. 6B is a flow diagram showing the response of a simulation code to a store-exclusive instruction.

Figure 7:
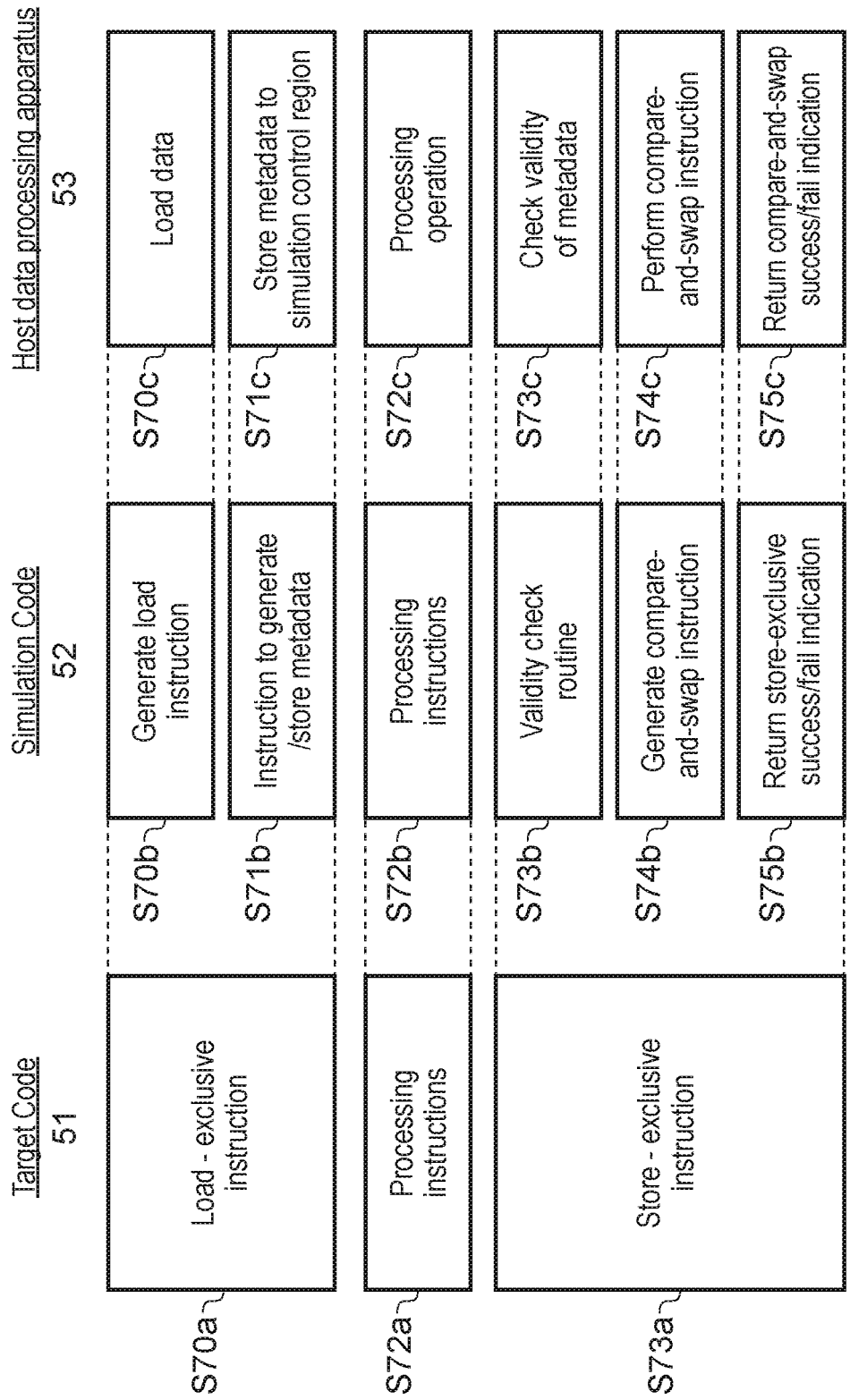

FIG. 7 shows a comparison between instructions of the target program code, instructions of the simulation code and actions performed by a host data processing apparatus.

Figure 8:
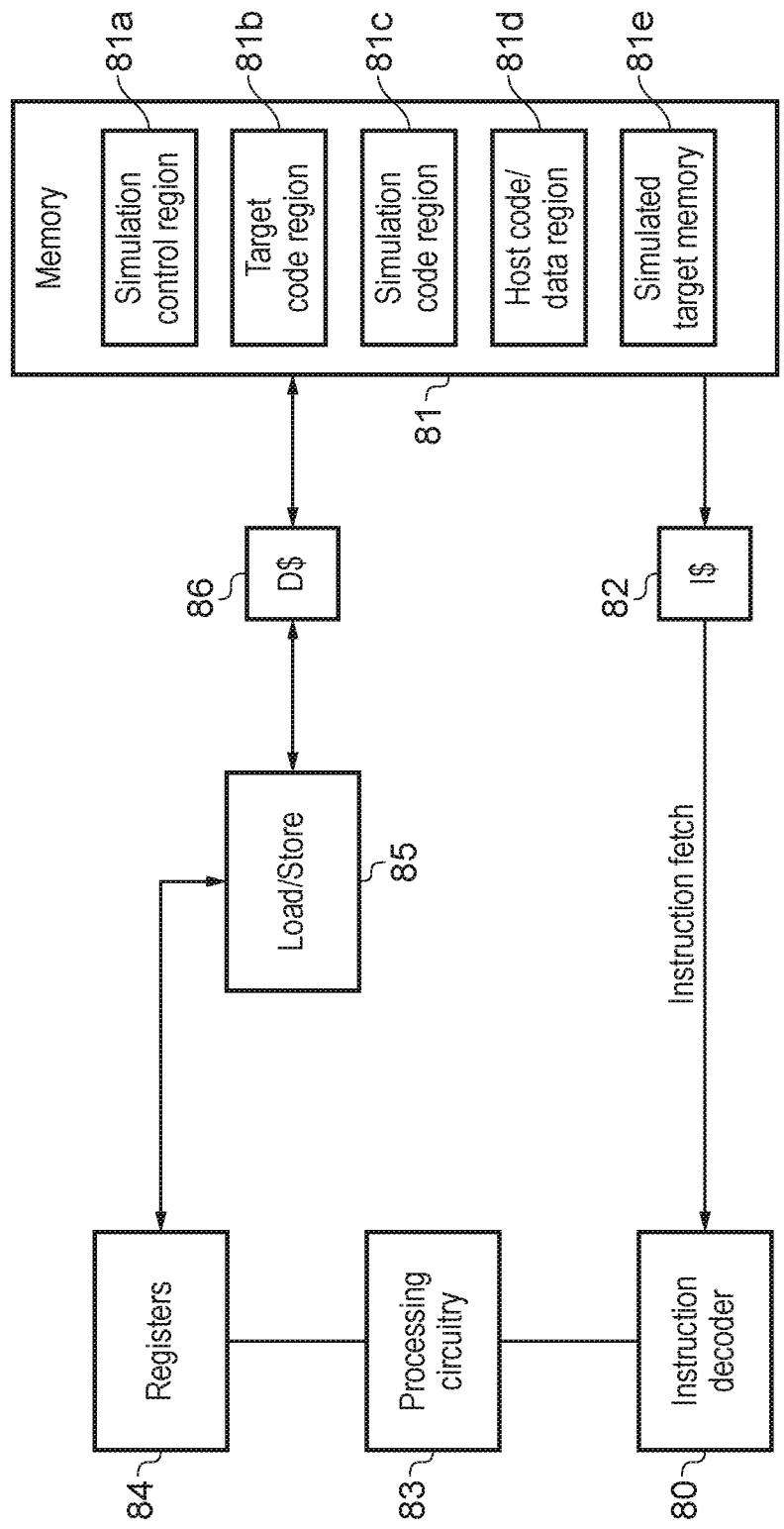

FIG. 8 schematically shows an example arrangement of the host apparatus for performing the simulation.

Figures 9A, 9B:
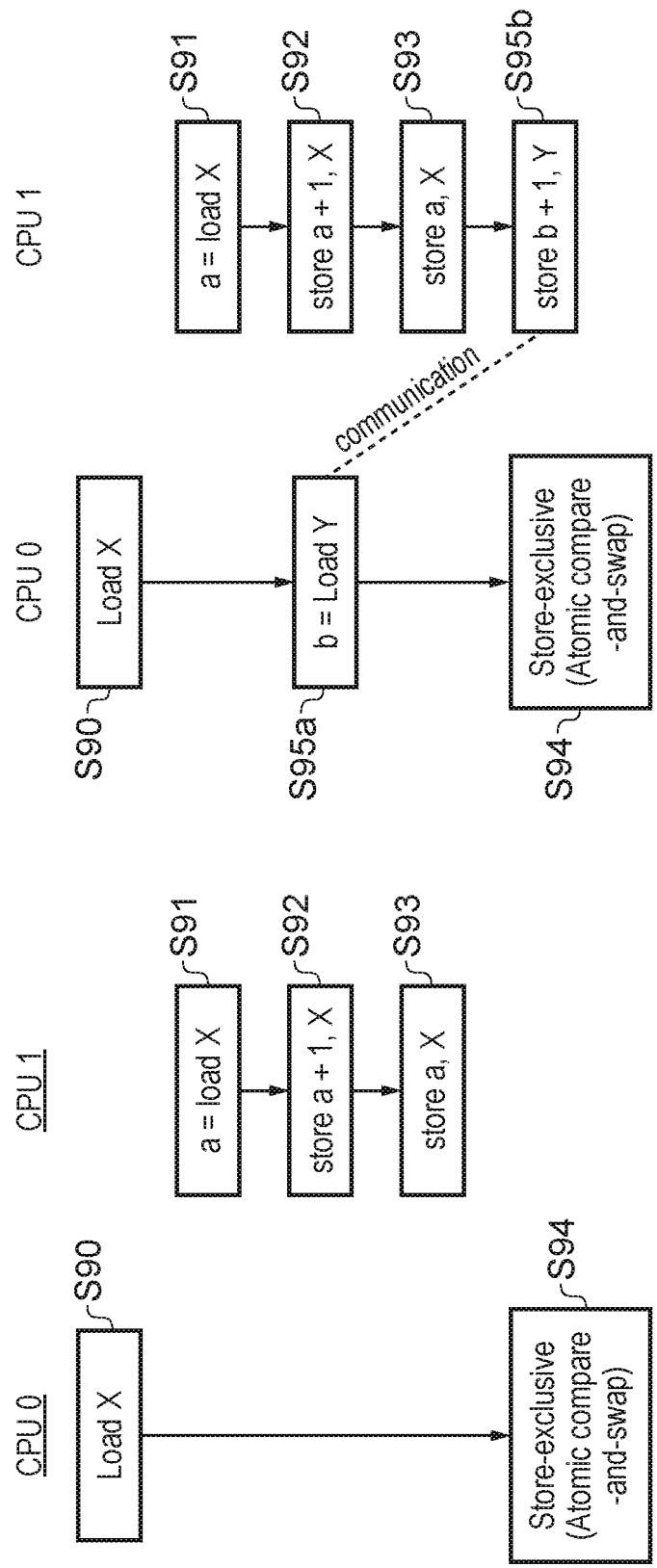

FIGS. 9A and 9B show possible sequences of instructions carried out by two processing agents accessing a shared resource.

Some data processing apparatuses provide atomic updates to a memory location using exclusive instructions, typically a combination of load-exclusive and store-exclusive instructions.

In executing a load-exclusive instruction, the data processing apparatus loads the data from a memory location specified by the load-exclusive instruction and tags the memory location as exclusive for that data processing apparatus. In executing a store-exclusive instruction, the apparatus determines whether the memory location specified by the instruction is still tagged as exclusive following the corresponding load-exclusive instruction (accesses to the location tagged as exclusive by other processes may cause the exclusive tag to be removed). If the memory location is no longer tagged as exclusive, the processing apparatus returns a store-exclusive fail indication and does not write to the memory location. Conversely, if the memory location is still tagged as exclusive, the process continues and the data processing apparatus stores the data to the specified memory location and returns a store-exclusive success indication.

The techniques discussed below provide a simulation of a target data processing apparatus configured to execute instructions in some target program code. The simulation may be performed on a host data processing apparatus which does not support (is not able to execute) some of the instructions in the target program code. The simulation may take instructions from the target program code as an input and map these instructions onto corresponding instructions which can be executed by the host data processing apparatus to produce the same effect. A particular example of this may be load/store-exclusive instructions, which are not supported by some host data processing apparatuses.

One way to simulate exclusive instructions on a host data processing apparatus that does not support exclusive instructions is to ensure that only one simulated CPU (central processing unit) in the system is executing at a time. In this way, other simulated CPUs (or other processing threads in the same simulated CPU) are prevented from interfering with memory updates, and so atomicity is ensured. However this can have a significant negative effect on performance as parallel processing of multiple threads is not possible in this arrangement.

Another way to simulate exclusive instructions on a host data processing apparatus that does not support exclusive instructions is to use memory protection to change the memory location to read-only when the load-exclusive instruction is encountered. Again, this ensures the atomicity of memory updates to that location by preventing other simulated CPUs from updating the location until the store-exclusive instruction is reached. However, this approach adds a considerable overhead to the execution of exclusive instructions, for example additional instructions may be required for setting the memory protection permissions.

Another way to simulate exclusive instructions on a host data processing apparatus that does not support exclusive instructions is to disable fast access to the relevant area of memory, for example by disabling direct memory access to memory from other devices in the host apparatus bypassing the CPU, such that every memory access request can be checked by an exclusive monitor in the simulation code to determine whether to allow the update. However, this approach also adds considerable overhead to the execution of exclusive instructions, as it slows down all memory accesses to the relevant area of memory.

A simulation as described may simulate a load-exclusive instruction in the target program code by generating a load instruction in the simulation code. The load instruction may specify a memory location in terms of a memory address and may be executed by the host data processing apparatus, which reads a value from the memory location specified by the load instruction. The simulation code also responds to the load-exclusive instruction by instructing the host data processing apparatus to store metadata relating to the load-exclusive instruction. This metadata may include the value read from the memory location in response to the load instruction.

To simulate a store-exclusive instruction in the target program code, the simulation may generate, in the simulation code, a compare-and-swap instruction. The compare-and-swap instruction which emulates the store-exclusive instruction may specify some new data, a memory location to store the data to and a compare value to be used. The compare value may be the value read from the memory location in the corresponding simulation of the load-exclusive instruction, as specified as part of the metadata stored in response to the load-exclusive instruction.

This method of simulating load/store-exclusive instructions using atomic compare-and-swap instructions is more efficient that the methods described above. In particular, the overhead for this method is much smaller. Also, as the compare-and-swap instruction specifies the data value loaded in response to the load instruction as the compare value, rather than some related tracking tag such as a version number counting how many updates have been made to the location, the atomicity does not depend on other threads behaving correctly and updating the tracking tag in the expected manner, which cannot be guaranteed in a simulation as there may be other threads executed by the host which are outside the control of the simulation code which simulates the processor executing the load/store exclusive pair. These benefits are achieved while still allowing parallel processing of multiple threads to be carried out, and so performance is not significantly affected.

As described in more detail below, the compare-and-swap instruction may control the host apparatus to read the value currently stored at the memory location specified and compare this value to the compare value. Dependent on the result of this comparison, the host data processing apparatus executing the instruction may write the new data to the memory. For example, this may be triggered if the compare value and the value currently stored are the same.

The compare-and-swap instruction generated in the simulation code may specify some new data—the store value—as the swap value to be written to the memory location. The compare-and-swap operation carried out by the host data processing apparatus in response to the compare-and-swap instruction may involve comparing the value currently stored at the memory location with the compare value. If the a predetermined condition is satisfied by the comparison, the host data processing apparatus may write the swap value to the memory location, replacing the value currently written at that location. The predetermined condition could be satisfied by the compare value and the value currently stored being the same, or it could be satisfied by the values being different. It will be appreciated that any other predetermined condition may be specified as appropriate to the processing operation being carried out.

In this way, a store-exclusive instruction can be efficiently simulated using an atomic compare-and-swap instruction. In the same way as for a store-exclusive instruction, the simulation can be configured to only write the new data value to memory if the memory location has not been updated since the simulation of the corresponding load-exclusive instruction. In response to execution of the compare-and-swap instruction, the host apparatus may return a compare-and-swap success or fail indication indicating whether the predetermined condition was satisfied by the comparison.

In response to the compare-and-swap success/fail indication, the simulation may return a store-exclusive success/fail indication as a response to the store-exclusive instruction, thus completing the simulation of a store-exclusive instruction. The compare-and-swap fail indication may be triggered if the compare value and the value currently stored at the memory location are different. However it will be appreciated that any other predetermined condition on the result of the comparison may be used; for example, a compare-and-swap fail indication may be triggered if the values are the same and a compare-and-swap success indication may be triggered if they are different. This allows the simulation to effectively simulate a response of a simulated CPU to a store-exclusive instruction.

The metadata generated in response to the load-exclusive instruction may be stored to a region of memory—a simulation control region—that is inaccessible to the target program code. For example, the metadata may not be part of the simulated architectural state of the target program code, but may be used by the simulation to control the way the target program code is simulated on the host.

The simulation may additionally perform a validity check on the stored metadata in response to a store-exclusive instruction. This validity check may be carried out before executing a compare-and-swap operation, and if the validity check fails the simulation may return a store-exclusive fail, and instead only proceed to the compare-and-swap operation if the validity check is successful. The validity check may use the metadata stored in response to the load-exclusive instruction. Validity checking in this way adds additional protection to ensure that the metadata are valid before writing a new value to the memory location.

The metadata stored in response to the load-exclusive instruction may include the value read from the memory location, the memory address of the load-exclusive instruction, the data size of the data to be read by the load, a memory attribute (e.g. read/write permissions) or any other information relating to the memory location or the load-exclusive instruction. The validity check may comprise checking whether corresponding attributes or parameters (e.g. address, data size or memory attributes) of the store-exclusive instruction are the same as the corresponding metadata of the load-exclusive instruction. This prevents mismatching pairs of load-exclusive and store-exclusive instructions being mapped to the load and compare-and-swap instructions in the simulation, which could lead to unpredictable outcomes.

The simulation may additionally return a store-exclusive fail indication when there is any indication of possible communication between the target program code and other program code; this communication need not necessarily be at the same memory location as the read/write involved in the load/store-exclusive instructions. This may be achieved by triggering a validity check fail if such an indication of possible communication is detected. In some examples, any event which could be used to provide communication between processes (such as a load/store) could be regarded as an indication of possible communication, even if that event could also be used for other operations not involving communication with other processes. The simulation may need to pessimistically assume that such an event may be a communication between processes, as actually determining whether it really is a communication may be impractical or expensive to implement in terms of performance.

In some cases, communication between the target program code and other program code executed on the same data processing apparatus may cause a store-exclusive fail indication in execution of real load/store-exclusive instructions, and this may need to be simulated in the simulation code. However, counter-intuitively, there may also be situations where communication between the target program code and some other program code (not involving the memory location specified by the load-exclusive instruction) would not trigger real load/store-instructions to fail, but may make the simulation less reliable. For example, with the compare-and-swap approach to simulation, if another process updates the location, but then makes a second update to the same location to restore the original value stored at that location before the first update, the compare-and-swap instruction would succeed as the value read from memory matches the previously loaded value specified in the metadata. However, a real pair of load/store-exclusive instructions would fail in this scenario as the exclusive tag for the location would be removed when the other process updated the location for the first time after the load-exclusive instruction. As the result of the compare-and-swap instruction in this case is the same as would have been generated by the store-exclusive instruction in a real system if there had been no intervening access from other simulated processes, in the absence of possible communication, it may be acceptable to allow the compare-and-swap instruction to succeed despite the intervening access from other processes (although the simulation does not completely replicate the behaviour of the real target system, as it gives the same result it is acceptable).

However, if there is a communication with another simulated process, that communication could lead the other process to assume that the process including the load/store-exclusive instructions would fail its exclusivity check due to the intervening access from another process, so allowing the compare-and-swap instruction to succeed could lead to incorrect behaviour if action has been taken in another simulated process assuming the store-exclusive instruction of the first process would fail. Therefore, even though a communication not involving the memory location targeted by the load-exclusive instruction would not cause the store-exclusive instruction to fail in the real system to be simulated, in the simulation using the atomic compare-and-swap instruction, an event indicative of a possible communication other than a memory access to the memory location specified by the load-exclusive instruction may cause the validity check to fail.

The validity check may additionally fail in response to the detection of an exception in the time between the load-exclusive and store-exclusive instructions.

In any of the above cases of an event leading to a validity check fail, the simulation may respond to the event by replacing a value of the stored metadata with some reserved value which would not be used for valid metadata. The validity check performed when the store-exclusive instruction is encountered may then fail if it is determined that one of the values in the metadata is said reserved value. This provides a way for a multitude of different events to trigger a store-exclusive fail. The simulation may alternatively store one of a variety of reserved values for each of a variety of different events, such that information about the reason for the store-exclusive fail may be inferred from the particular reserved value stored in the metadata.

If the simulation attempts to carry out a particular store-exclusive instruction a predetermined number of times—that is, if the validity check fails a predetermined number of times—an alternative technique for simulating a store-exclusive instruction may be attempted instead. For example, this could be one of the options discussed above, such as limiting to one simulated CPU or agent running at a time, or changing memory protection permissions for the relevant region of memory to read only. This allows for progress to be made when it otherwise might not. This is particularly useful in the case where there is limited information on whether conflicts between processes are occurring. In this case, the host data processing apparatus may need to be relatively cautious in the validity checking, and may detect some false positive fails (e.g. assuming that a load/store which could cause conflict did cause conflict regardless of whether it actually does). By providing alternative simulation techniques, forward progress can still be made, but by trying the compare-and-swap approach first performance can be improved in cases where this approach succeeds.

The host data processing apparatus described may be controlled by a computer program, in order to perform any of the methods described. This computer program may be stored on a non-transitory storage medium configured to be read and executed by a computer.

Particular embodiments of the technique will now be described with reference to the accompanying figures.

Figure 1B:
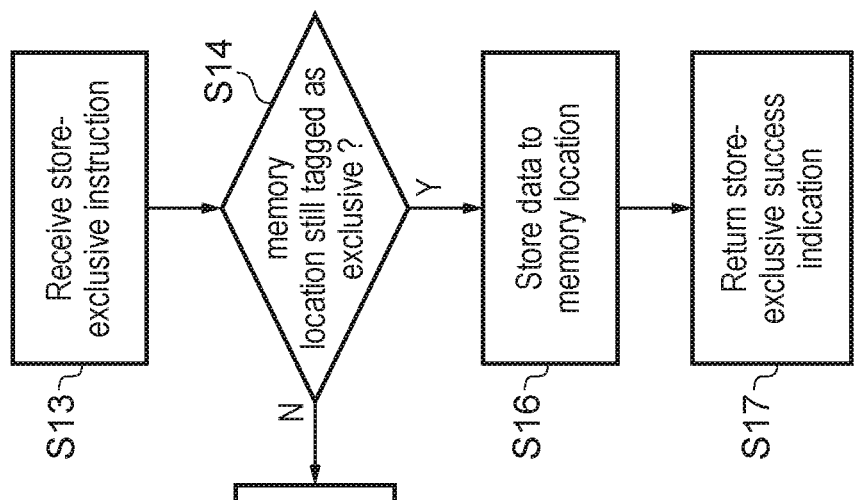
FIG. 1B is a flow diagram showing an example of a response of a data processing apparatus to a store-exclusive instruction.
Figure 1A:
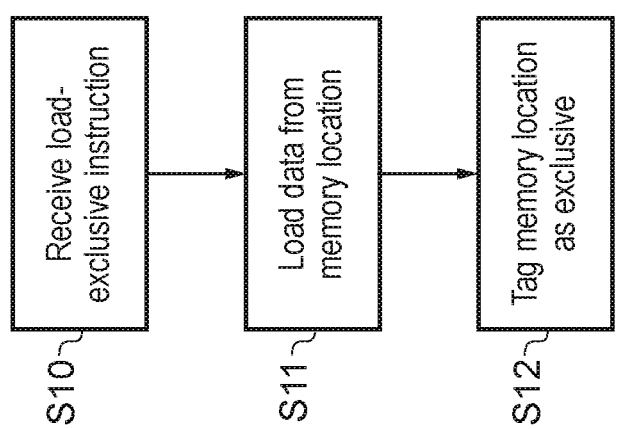
FIG. 1A is a flow diagram showing an example of a response of a data processing apparatus to a load-exclusive instruction.

FIG. 1A shows an example of a response of a data processing apparatus to a load-exclusive instruction and FIG. 1B shows an example of a response of a data processing apparatus to a store-exclusive instruction. The methods shown in both FIG. 1A and FIG. 1B relate to a real data processing apparatus that does support exclusive instructions. Referring to FIG. 1A, in step S10 the data processing apparatus receives a load-exclusive instruction. The load-exclusive instruction specifies a memory location to load data from. In step S11, the data processing apparatus loads the data from the memory location specified by the load-exclusive instruction to a register of the processing apparatus (optionally the data may also be transferred to a cache). In step S12, the data processing apparatus tags the memory location as exclusive for that data processing apparatus. Any method of tagging the memory location may be applied. For example, the memory location may be tagged by setting a flag, setting a bit in the memory location to a predetermined value or recording, elsewhere in the apparatus, an indication that that memory location has been marked as exclusive (for example by storing the address in a buffer of tagged memory address locations). It will be appreciated that the tagging could be done at the granularity of larger blocks of memory locations, not just for an individual location.

Referring to FIG. 1B, in step S13 the data processing apparatus receives a store-exclusive instruction. The store-exclusive instruction specifies a memory location to store data to and data to write to the memory location. In step S14, the apparatus checks whether the memory location specified by the store-exclusive instruction is still tagged as exclusive for that data processing apparatus. If the data processing apparatus determines that the memory location is no longer tagged as exclusive, the process proceeds to step S15 and the data processing apparatus returns a store-exclusive fail indication. Typically, the processing apparatus does not update the memory location following a store-exclusive fail indication. The processing apparatus may instead return to S10 and repeat the load-exclusive operation before attempting to repeat the store-exclusive operation.

If, instead, it is determined in step S14 that the memory location is still tagged as exclusive, the process continues to step S16 and the data processing apparatus stores the data to the memory location specified by the store-exclusive instruction. In step S17, the processing apparatus returns a store-exclusive success indication.

FIG. 2 shows an example of an apparatus for performing atomic updates of a memory location using exclusive instructions such as the example given above. FIG. 2 shows two central processing units CPU0 (20) and CPU1 (21), which access a memory 22 via an interconnect 23. When a CPU makes a memory access request specifying a memory location, the exclusive monitor 24 in the interconnect 23 determines whether the memory location specified by the memory access request is tagged as exclusive for that apparatus. If it is tagged as exclusive, the CPU may be prevented from updating the memory location. Although FIG. 2 shows only two CPUs, it will be appreciated that any number of CPUs could be present. Also, it will be appreciated that the apparatus could execute multiple instruction threads on the same CPU, with the exclusive monitor 24 providing one thread with exclusive access to protect against intervening accesses from other threads.

FIG. 3 shows an example of a memory access request from one of the CPUs 20, 21 in FIG. 2. The memory access shown in FIG. 3 may be via the interconnect 23. In step S30, the data processing apparatus receives a memory access request from one of the CPUs 20, 21 specifying a location in memory 22. In step S31, the data processing apparatus determines whether another CPU or thread has exclusive access to the memory location specified by the memory access request—that is, whether another CPU or thread has tagged the memory location as exclusive. If the memory location is not tagged as exclusive, the process proceeds to step S32 and the memory access is performed. If it is determined in step S31 that the memory location has been tagged as exclusive, then the process instead passes to step S33 and the exclusive tag is removed for the memory location. This may be done by removing, changing or resetting a flag set by the load-exclusive instruction, erasing or overwriting a bit in the memory location set by the load-exclusive instruction, recording elsewhere in the apparatus that a memory access has taken place at that location, or any other method of labelling the memory location as updated. The process then proceeds to step S32. Although FIG. 3 shows the process passing directly to step S32 if the memory location is not tagged as exclusive, it will be appreciated that the process may instead pass to step S33 regardless of whether or not the memory location is labelled as exclusive. In some embodiments, the exclusive tag may be removed for store requests which update the memory location, but not for load requests which read the location. Alternatively, other embodiments may remove the exclusive tag in response to both load and store accesses. This process may be controlled by exclusive monitor 24 in interconnect 23.

FIG. 4 shows an example of a response of a data processing apparatus to an atomic compare-and-swap instruction. In step S40, the data processing apparatus receives a compare-and-swap instruction specifying a memory location, a compare value and a new data value to be written to the memory location. In step S41, the data processing apparatus reads the value currently stored at the memory location specified by the compare-and-swap instruction. In step S42, the data processing apparatus determines whether the value read is the same as the compare value. If the two values are not the same, the processes proceeds to step S43 and the data processing apparatus returns a compare-and-swap fail indication; on the other hand, if the two values are the same, the process proceeds to step S44 and the new data value is written to the memory location. Also, in step S45, the data processing apparatus returns a compare-and-swap success indication. It should be noted that although FIG. 4 describes returning a compare-and-swap fail indication when the load value and compare value are not the same, it is also possible to return a compare-and-swap fail when some other predetermined condition is not met—for example when they are the same.

FIG. 5 shows an example of an arrangement for a simulation. A target data processing apparatus for running target program code 51 is simulated by simulation 50, which comprises simulation code 52 and host data processing apparatus 53. Simulation code 52 is configured to simulate target program code 51 in a form that can be executed by host data processing apparatus 53. Target program code 51 may be program code configured to be executed by a target data processing apparatus configured to support instructions that host data processing apparatus 53 cannot support. For example, target program code 51 may include exclusive instructions, and host data processing apparatus 53 may not be configured to support exclusive instructions. In this example, simulation program code 52 may be configured to convert exclusive instructions into instructions that can be executed by host data processing apparatus 53. The simulation program code 52 may include load-exclusive program logic 52a to map load-exclusive instructions in the target program code 51 to load instructions according to the methods described below, and store-exclusive program logic 52b to map store-exclusive instructions to compare-andswap instructions according to the methods described below. Although FIG. 5 only shows a single layer of simulation, it will be appreciated that in some arrangements, there may be multiple layers of simulation between the hardware and the provided instruction execution environment, and/or multiple distinct instruction execution environments provided on the same host processor.

FIGS. 6A and 6B show an example of a method according to the present technique. FIG. 6A shows an example of a response of the simulation code 52 to a load-exclusive instruction in the target program code 51, according to the present technique. In step S60, a load-exclusive instruction specifying a memory location is detected in the target code 51. In step S61, the simulation program code 52 generates a load instruction for execution by the host apparatus 53, to load data from the memory location specified by the load-exclusive instruction. In step S62, the method comprises generating and storing metadata relating to the memory location specified by the load-exclusive instruction. The metadata stored may include, for example, the value loaded from the memory location, the memory address, the size of the data or a memory attribute. It will be appreciated that any other information relating to the memory location also may be included in the metadata.

FIG. 6B shows an example of a response of the simulation code 52 to a store-exclusive instruction in the target program code 51, according to the present technique. In step S63, a store-exclusive instruction specifying a memory location and data to be stored at that location is detected in the target code 51. In step S64, the validity of the metadata relating to that memory location is checked and, in step S65, it is determined whether or not the metadata is valid. The validity check may comprise checking whether the store-exclusive instruction specifies the same memory address, data size or memory attribute as the load-exclusive instruction. The validity check may also indicate that the metadata is invalid if the metadata has been replaced by a reserved value. The metadata may be replaced by such a reserved value if, for example, an exception has been detected in a period between the load-exclusive instruction and the store-exclusive instruction. The metadata may also be replaced if an event indicative of a possible communication between the target program code 51 and some other program code has been detected. If the metadata is not valid, the process proceeds to step S66 and a store-exclusive fail indication is returned. Alternatively, if the metadata is determined to be valid in step S65, the process proceeds to step S67 in which a compare-and-swap instruction is generated by the simulation code 52 for execution by the host data processing apparatus 53. The compare-and-swap instruction generated in step S67 is the compare-and-swap instruction described in FIG. 4, with the load value (stored in the metadata) specified as the compare value in step S42. In S68, it is determined whether the compare-and-swap operation in step S67 was successful. If the compare-and-swap procedure of FIG. 4 returns a compare-and-swap success indication in step S45, it is determined in step S68 that the compare-and-swap operation was successful, and the process continues to step S69, in which a store-exclusive success indication is returned by the simulation code 52 to the target code 51. On the other hand, if the compare-and-swap process of FIG. 4 returns a compare-and-swap fail indication in step S43, it is determined in step S68 that the compare-and-swap operation was not successful, and the process proceeds to step S66, in which a store-exclusive fail indication is returned by the simulation code 52 to the target code 51.

Following a store-exclusive fail indication, the target code 51 may loop back to the load-exclusive instruction, and so the process of FIGS. 6A and 6B may be repeated from step S60. The apparatus may be configured such that, after a certain number of loops or after a certain amount of time, the simulation code 52 falls hack to an alternative method for simulating exclusive instructions, in order to allow progress to be made. Alternatively, the apparatus may be configured to end the process and signal an exception after a certain number of loops.

Load/store-exclusive instructions in the target program code 51 can also be translated into translated instructions supported by the host ahead of time, before execution of the instructions by the host data processing apparatus 53 is required. That is, the load or compare-and-swap instructions generated in response to load-exclusive or store-exclusive instructions may not be executed at the same time as being generated, but may be stored to memory to be executed at a later time. The apparatus may also be configured to cache sequences of the translated host code corresponding to the target code 51, or store them to a region of memory, so that if the same program address in the target program code 51 is reached at a later time, the previously translated instructions can be read from memory rather than having to make the same mapping decisions as the first time that program address was encountered. Hence, in some cases the simulation code may respond to a load-exclusive instruction by generating host instructions to perform the operations shown in S61 and S62 and storing these instructions for later use. Similarly, the simulation code may respond to a store-exclusive instruction by generating instructions to perform the operations shown in S64-S69 and storing these instructions for later use. Thus, the translation may be performed once to map a sequence of code including the load/store exclusive instructions to a sequence of code including the load instruction, the compare-and-swap instructions and any intervening instructions for controlling the metadata storage, validity checking, and simulation of the store-exclusive success/fail response based on the compare-and-swap success/fail indication, on subsequent occasions when the same portion of the target code is reached during execution of the target code on the simulator, it may not be necessary to perform the translation again, as this time the host instructions to be executed can simply be read from memory or a cache.

FIG. 7 shows an example of how instructions in the target program code 51 correspond to instructions in the simulation code 52 and actions performed by the host data processing apparatus 53. In step S70a, a load-exclusive instruction in the target program code 51 is responded to by the generation of a load instruction S70b and an instruction to generate/store metadata S71b in the simulation code 52. The load instruction S70b in the simulation code 52 is responded to in the host data processing apparatus 53 by loading of the relevant data S70c and the instruction to generate/store metadata S71b is responded to by the storing of metadata to the simulation control region of memory S71c. The simulation control region will be discussed in greater detail later. In step S72a, processing instructions in the target program code 51 are responded to by corresponding processing instructions S72b in the simulation code 52, which instruct the host data processing apparatus 53 to carry out a corresponding processing operation S72c in the host data processing apparatus 53. In step S73a, a store-exclusive instruction in the target program code 51 is responded to in the simulation code 52 by i) a validity check routine S73b which instructs the host data processing apparatus 53 to check the validity of the relevant metadata S73c and ii) generation of a compare-and-swap instruction S74b, which instructs the host data processing apparatus 53 to perform a compare-and-swap operation. In step S75c, the host data processing apparatus 53 returns a compare-and-swap success/fail indication and the simulation code 52 responds by returning a store-exclusive success/fail indication.

FIG. 8 shows an example configuration of a host data processing apparatus 53 configured to carry out the method described above. The host data processing apparatus 53 of FIG. 8 comprises an instruction decoder 80 to decode instructions fetched from the memory 81 via an instruction cache 82, processing circuitry 83 to execute instructions decoded by the instruction decoder 80, registers 84 and load/store circuitry 85 configured to perform load/store operations from/to memory 81 via data cache 86. Memory 81 contains regions such as the simulation control region 81a, a target program code region 81b storing the target program code 51, a simulation code region 81c storing the simulation code 52, a host code/data region 81d storing the host code and data and a simulated target memory region 81e. The simulation control region 81a is a region of memory inaccessible to the target program code 51, and is the region where metadata is stored in response to a load-exclusive instruction. The simulated target memory region 81e is the region of memory accessible to load/store-exclusive instructions in the target program code 51.

The method described above allows load/store-exclusive instructions to be simulated on a host data processing apparatus 53 that does not support exclusive instructions by using an atomic compare-and-swap instruction. The method described has a much smaller overhead than other methods, and allows for parallel processing. The above-described method also provides the advantage that it does not rely on the behaviour of other data processing apparatuses, other CPUs or other threads on the same CPU to ensure the atomicity of updates.

The method described may be performed by an apparatus comprising a host data processing apparatus 53 as described and control circuitry to control the host data processing apparatus 53. The control circuitry may be included in the host data processing apparatus 53 or may be separate to the host data processing apparatus 53.

The method described above may be performed by a host data processing apparatus 53 in response to a computer program stored on a non-transitory computer-readable storage medium.

The method as described may be counter-intuitive to one skilled in the art as it may appear that a host data processing apparatus 53 carrying out the method may return incorrect success/fail indications. However, this is not a concern as demonstrated below by way of an example, referring to FIGS. 9A and 9B.

FIG. 9A shows one simulated CPU (CPU0) simulating load/store-exclusive instructions according to the present technique, and another simulated CPU (CPU1) carrying out processing operations at the same memory location X. At step S90 CPU0 performs a load operation (simulating a load-exclusive operation) at memory operation X, and at step S94 CPU0 performs an atomic compare-and-swap operation (simulating a store-exclusive operation) at the same memory location X. In the meantime, between steps S90 and S94, CPU1 performs processing operations on data at the same memory location X. In step S91, CPU1 loads the data value (a) stored at X; at step S92, CPU1 stores a different value at location X (in this example the different value is a+1), and in step S93, CPU1 stores the original value (a) to location X. If the process carried out by CPU0 was carried out using exclusive instructions, the store-exclusive operation at step S94 would fail as the memory location at X would be labelled as updated (or the exclusive tag would be removed) at step S92, However, in the method of the present technique, the atomic compare-and-swap operation at S94 succeeds, since the value stored at X is the same as the load value stored in the metadata. In this way, the atomic compare-and-swap operation returns a success indication when a store-exclusive operation would return a fail indication. However, in this example such a discrepancy would not be a problem, as long as the value stored at X is returned to its original value before the atomic compare-and-swap operation is carried out, and provided there is no communication between CPU0 and CPU1. This is valid because there is no way for either CPU0 or CPU1 to know whether the load operation performed at S90 occurred before S92 or after S93. Thus, an atomic compare-and-swap instruction used according to the method described is still an appropriate simulation for load/store-exclusive instructions in this case.

A situation where the atomic compare-and-swap operation may not provide the desired result is when there is communication between CPU0 and CPU1, as shown in FIG. 9B. In FIG. 9B, some communication S95 takes place between CPU0 and CPU1 at a different memory location Y. It is possible that communication could cause simulated CPU1 to deduce that the load/store-exclusive pair in CPU0 should fail which, if the store-exclusive at S94 succeeds because X has returned to its previous value by the time the store-exclusive instruction is encountered, could lead to incorrect results. Therefore, in order to provide additional protection, some embodiments return a store-exclusive fail indication if there is any indication of possible communication between the simulated CPUs, even if that communication concerns a memory location other than the block of one or more memory locations tagged for exclusive access in response to the load-exclusive instruction. This may be achieved by replacing the stored metadata with a reserve value so that validity checks during simulation of a store-exclusive instruction determine that the metadata is not valid.

It will be appreciated that the scenario depicted in FIG. 9B is just one example of a possible event that should trigger a fail indication, and other events including other forms of communication may also trigger a fail indication.

Although the technique has been described in detail in terms of specific embodiments, it will be appreciated that the technique is not limited to the specific embodiments described herein. The embodiments described may be modified or adapted in numerous ways without departing from the scope of the technique as defined in the claims.

The invention claimed is:

1. A method for controlling execution of target program code on a host data processing apparatus to simulate execution of the target program code on a target processing apparatus, the method comprising:

in response to a load-exclusive instruction of the target program code for instructing the target processing apparatus to load a value from a memory location and tag the memory location as exclusive, mapping the load-exclusive instruction to a load instruction to be executed by the host data processing apparatus to load the value from the memory location, and storing metadata related to the load-exclusive instruction, wherein the metadata comprises at least the value loaded from the memory location; and in response to a store-exclusive instruction of the target program code for instructing the target processing apparatus to determine whether the memory location is still tagged as exclusive and to write a store value to the specified memory location in response to determining that the memory location is still tagged as exclusive, emulating the store-exclusive instruction using an atomic compare-and-swap instruction to be executed by the host data processing apparatus;

the atomic compare-and-swap instruction specifying, as a compare value to be compared against the value stored at the memory location when the atomic compare-and-swap instruction is executed, the value loaded from the memory location as specified by the metadata.

2. A method according to claim 1, wherein the store-exclusive instruction specifies the store value to be stored to the memory location, and the method comprises specifying the store value of the store-exclusive instruction as a swap value to be stored at the memory location when a comparison between the compare value and the value stored at the memory location satisfies a predetermined condition when the atomic compare-and-swap instruction is executed.

3. A method according to claim 1, comprising:

in response to a compare-and-swap fail indication indicating that a comparison between the compare value and the value stored at the memory location failed to satisfy a predetermined condition, returning a store-exclusive fail as a response to the store-exclusive instruction.

4. A method according to claim 1, wherein the metadata is stored in a simulation control region of memory inaccessible to the target program code.

5. A method according to claim 1, comprising:

in response to the store-exclusive instruction, performing a validity check to check the validity of the metadata; and when the validity check fails, returning a store-exclusive fail as a response to the store-exclusive instruction.

6. A method according to claim 5, wherein the metadata comprises at least one of a memory address, a data size and a memory attribute specified by the load-exclusive instruction, and the validity check comprises checking whether the store-exclusive instruction specifies the same memory address, data size or memory attribute as the load-exclusive instruction.

7. A method according to claim 5, wherein the validity check fails when an event indicative of a possible communication between the target program code and other program code has been detected in a period between the load instruction and the atomic compare-and-swap instruction.

8. A method according to claim 7, wherein the event comprises an event other than a memory access to the memory location addressed by the load-exclusive instruction.

9. A method according to claim 5, wherein the validity check fails when an exception has been detected in a period between the load instruction and the atomic compare-and-swap instruction.

10. A method according to claim 5, wherein in response to a store-exclusive-fail-triggering event, replacing a value of the metadata with a reserved value, and in response to the store-exclusive instruction, detecting that the validity check fails when the metadata has the reserved value.

11. A method according to claim 5, comprising:

when the validity check fails for a predetermined number of attempts to simulate the store-exclusive instruction using the atomic compare-and-swap instruction, triggering operation of an alternative method for simulating execution of the store-exclusive instruction.

12. A non-transitory, computer-readable storage medium storing a computer program for controlling a host data processing apparatus to perform the method of claim 1.

13. An apparatus comprising:

host processing circuitry; and control circuitry configured to control the host processing circuitry to carry out the method of claim 1.

14. A computer program stored on a non-transitory, computer-readable storage medium, the computer program being for controlling execution of target program code on a host data processing apparatus to simulate execution of the target program code on a target processing apparatus, wherein the computer program comprises:

load-exclusive program logic to map, in response to a load-exclusive instruction of the target program code for instructing the target processing apparatus to load a value from a memory location and tag the memory location as exclusive, the load-exclusive instruction to a load instruction to be executed by the host data processing apparatus to load the value from the memory location, and to store metadata related to the load-exclusive instruction, wherein the metadata comprises at least the value loaded from the memory location; and store-exclusive program logic responsive to a store-exclusive instruction of the target program code for instructing the target processing apparatus to determine whether the memory location is still tagged as exclusive and to write a store value to the specified memory location in response to determining that the memory location is still tagged as exclusive, to emulate the store-exclusive instruction using an atomic compare-and-swap instruction to be executed by the host data processing apparatus;

the atomic compare-and-swap instruction specifying, as a compare value to be compared against the value stored at the memory location when the atomic compare-and-swap instruction is executed, the value loaded from the memory location as specified by the metadata.

* * * * *